United States Patent [19]
Togawa

[11] Patent Number: 5,684,362
[45] Date of Patent: Nov. 4, 1997

[54] PLASMA ADDRESSED ELECTRO-OPTICAL DEVICE HAVING A PLASMA DISCHARGE CHAMBER

[75] Inventor: Takahiro Togawa, Kanagawa, Japan

[73] Assignee: Sony Corporation, Tokyo, Japan

[21] Appl. No.: 506,876

[22] Filed: Jul. 25, 1995

[51] Int. Cl.$^6$ .................................................... H01J 17/49
[52] U.S. Cl. ........................... 313/582; 313/584; 313/586
[58] Field of Search .................................. 313/582, 583, 313/584, 586

[56] References Cited

U.S. PATENT DOCUMENTS

| | | | |
|---|---|---|---|
| 5,349,455 | 9/1994 | Hayashi et al. | 313/582 |
| 5,351,144 | 9/1994 | Tanamachi | 313/484 |
| 5,495,142 | 2/1996 | Hayashi | 313/584 |
| 5,525,862 | 6/1996 | Miyazaki | 313/582 |

FOREIGN PATENT DOCUMENTS 6-208109  7/1994  Japan .

*Primary Examiner*—Sandra L. O'Shea
*Assistant Examiner*—Vip Patel
*Attorney, Agent, or Firm*—Hill, Steadman & Simpson

[57] ABSTRACT

A plasma addressed electro-optical device intended to assure the flatness of a microsheet glass used as the separation sheet provided between a liquid crystal cell and a plasma cell includes dummy barrier ribs on a glass substrate to support the microsheet glass at the external side of frit seal of the plasma cell formed using a low melting point glass material. The plasma address electro-optical device has a first substrate having a plurality of first electrodes arranged in parallel with each other on one principal surface thereof, a second substrate having a plurality of second electrodes arranged in parallel with each other crossing the first electrodes on the principal surface of the first substrate opposed to the first electrodes, a microsheet glass provided between the first and second substrates, electro-optical material layer provided between the first substrate and the microsheet glass, a plasma cell formed by bonding the circumferential portions of the second substrate and the microsheet glass with a low melting point glass, the plasma cell including a plurality of barrier ribs formed along the surfaces of the second electrodes, and dummy barrier ribs provided at the external side of the low melting point glass to support the microsheet glass.

7 Claims, 14 Drawing Sheets

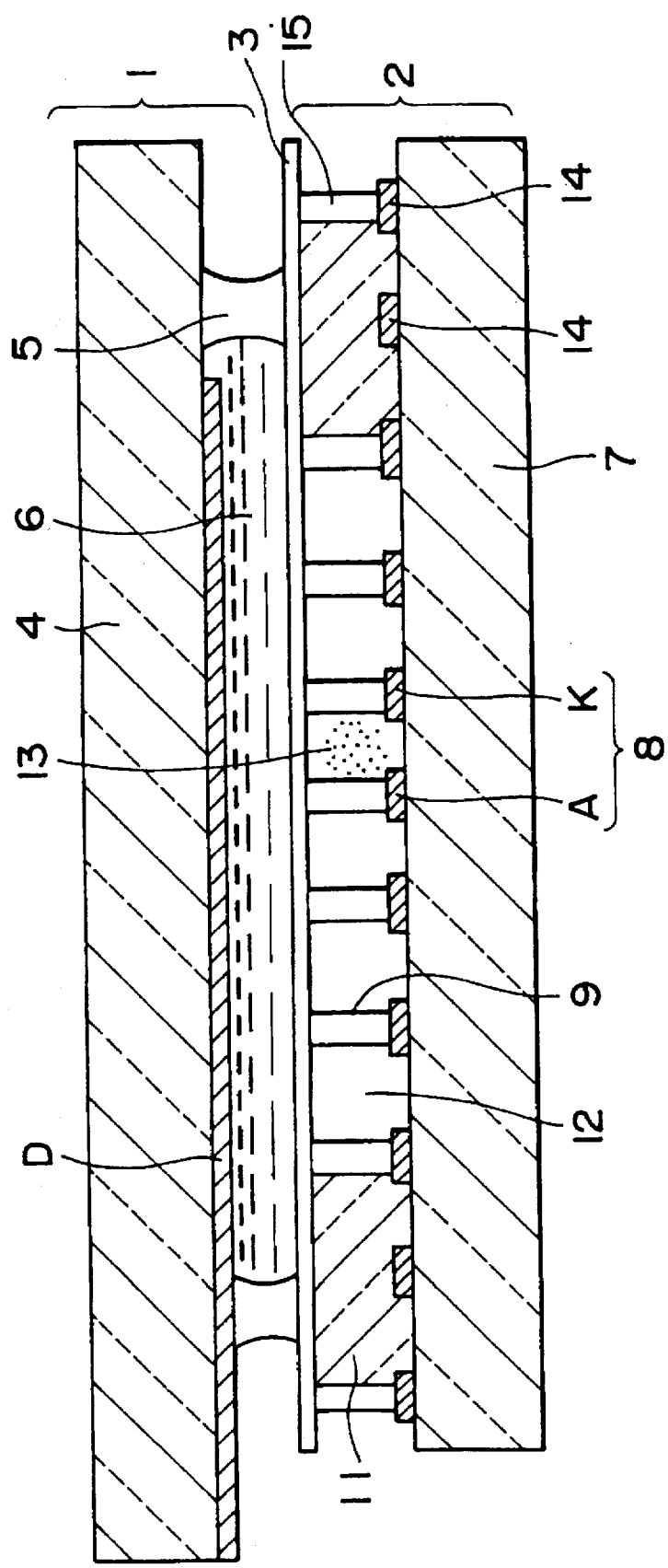

PLASMA ADDRESSED ELECTRO-OPTICAL DEVICE HAVING A PLASMA DISCHARGE CHAMBER

BACKGROUND OF THE INVENTION

1. Field of the Invention

The present invention relates to a plasma addressed electro-optical device consisting of a double-layer structure comprising an electro-optical cell such as a liquid crystal cell and a plasma cell and more specifically to a sealing structure of plasma cells.

2. Description of Related Arts

As a means for realizing a high resolution and high contrast matrix-type electro-optical device utilizing liquid crystal cells, for example, a liquid crystal display device, there is a generally well known system, a so-called active matrix address system, wherein switching elements such as thin film transistors, etc., are provided for each pixel and these elements are driven line-sequentially. However, in this case, a large number of semiconductors such as thin film transistors have to be mounted on a substrate and particularly it is a serious problem that the manufacturing yield is deteriorated as the a display area becomes wider. Therefore, as a means for overcoming such a problem, a system where a switching element consisting of a thin film transistor, etc. is replaced with a plasma switch has been previously disclosed in the U.S. Pat. No. 4,896,149 to Buzak (Issue date Jan. 23, 1990) and U.S. Pat. No. 5,077,553 to Buzak (Issue date Dec. 31, 1991).

A structure of a plasma addressed display device in which the liquid crystal cells are driven by means of the switches based on plasma discharge will be briefly explained hereunder. As shown in FIG. 7, this device has a laminated flat panel structure consisting of a liquid crystal cell 101, a plasma cell 102 and a separation sheet 103 made of a microsheet glass provided between both cells. The plasma cell 102 is formed using a glass substrate 104 and is also provided with a plurality of channels 105 at the surface thereof. These channels 15 are extended, for example, in the row direction of a row-and-column matrix. Each channel 105 is sealed by the separation sheet 103 to form individually separated plasma chambers 106. Each plasma chamber 106 is filled with an ionizable gas. A raised portion 107 separating adjacent channels 105 serves as a partition which defines individual plasma chambers 106 and also has a function as a gap spacer of each plasma chamber 106. At the bottom part of each channel 15, a pair of plasma electrodes 108 and 109 are provided in parallel with each other. A pair of the electrodes function as an anode and a cathode to generate discharge plasma by ionizing the gas in the plasma chamber 106. Such discharge area is defined as a row scanning unit.

Meanwhile, the liquid crystal cell 101 is formed using a glass substrates 110. These glass substrate 110 is provided opposed by a predetermined gap with respect to the separation sheet 103 and the gap is filled with the liquid crystal layer 111. Moreover, signal electrodes 112 consisting of a transparent conductive material are formed at the internal surface of the glass substrate 110. These signal electrodes 112 are provided perpendicular to the plasma chamber 106 as a column drive unit. The pixels are defined in the matrix form at the intersecting points of the column drive unit and row scanning unit.

The display device having such structure as explained above executes display drive by line-at-a-time scanning the plasma chambers 106 for plasma discharge and also by applying an analog drive voltage to the signal electrode 112 of the liquid crystal cell in synchronization with the scanning. When plasma discharge is generated in the plasma chambers 106, the inside of the plasma chambers 106 is almost uniformly set to the anode potential to select the pixels of each line. That is, the plasma chambers 106 function as sampling switches. When a drive voltage is applied to each pixel while the plasma sampling switches are turned ON, the sampling condition is held to control the pixels to ON (lighting) or OFF (turning-out) state. Even after the plasma sampling switches are turned OFF, an analog drive voltage may be held as it is within the pixels.

Here, it may be thought that a video display device utilizing plasma switches as explained above is superior to that utilizing transistor switches in realization of a wider display area, however, the former device has various problems to be solved for the practical use. For instance, considerable difficulty lies, from the viewpoint of manufacturing process, in formation of the channels 105 on the glass substrate 104 to form plasma chambers 106. Particularly, it is extremely difficult to realize a high density of the channels 105. Moreover, it is also required to form the plasma electrodes 108 and 109 within the channel. However, the etching process for this purpose is complicated and it is also difficult to keep high precision for the interval between a pair of electrodes.

Considering the difficult problems explained above, a plasma addressed electro-optical device which assures easier manufacturing processes and suitable for realization of a wider and high precision display area has been previously disclosed in the U.S. patent application Ser. No. 07/837,961 for an Electro-Optical Device filed by Shigeki Miyazaki on Feb. 20, 1992 now abandoned. The disclosure of the above noted reference is incorporated herein. FIG. 8 illustrates a construction of such plasma addressed display device. This device is composed of one glass substrate 202 having, on the one principal surface, the signal electrodes 201 which are provided in parallel with each other and the other substrate 204 having, also on the one principal surface, a plurality of plasma electrodes 203 which are provided in perpendicular to the above signal electrodes and parallel with each other. A pair of these glass substrates 202 and 204 are arranged in parallel with each other separated by a separation means made of a microsheet glass 205. The space between the glass substrate 202 and microsheet glass 205 is filled with a liquid crystal layer 206 and sealed. Moreover, the space between the microsheet glass 205 and the lower glass substrate 204 is provided with a plasma chamber 207 which is filled with an ionizable gas. The barrier ribs 208 are formed by the printing method above each plasma electrode 203. The plasma chamber 207 is divided in the row direction by these barrier ribs 208 to form a row scanning unit. This printing method is a very simple technique and is capable of forming the desired fine patterns. This method has so far improved productivity and workability in comparison with a channel forming process introduced in the prior art explained previously. Moreover, the plasma electrodes 203 are formed on the flat glass substrate, enabling simple etching process and high precision control for the electrode-to-electrode distance.

Next, a method of manufacturing the device shown in FIG. 8 will be briefly explained with reference to FIG. 9. First, in the step S1, electrodes 203 are printed and fired on the surface of the glass substrate 204. Next, in the step S2, barrier ribs 208 or ribs are laminated along the electrodes 203 and these are printed and fired. Subsequently, in the step S3, the glass substrate 204 and the microsheet glass 205 are frit-sealed with each other using a low melting point glass material, etc. Finally, in the step S4, an upper glass substrate 202 is bonded on the microsheet glass 205 and the internal space between the upper glass substrate and microsheet glass is filled with the liquid crystal layer 206 to form a bonded liquid crystal cell.

Now, returning to FIG. 8, the problems to be solved by this device will be explained hereunder. As explained previously, a low melting point glass material 209 is generally used at the time of frit sealing of a microsheet glass 205 on a glass substrate 204. A low melting point glass paste 209 is supplied in the predetermined amount, for example, by a dispenser along the peripheral area of the glass substrate 204. However, amount of paste always fluctuates and a constant thickness cannot always be obtained. Therefore, there arises a problem that an uneven surface is generated along the frit sealing area, making it impossible to obtain the flatness of the microsheet glass 205 for the entire surface of the display area.

In addition, ribs 208 are formed by the thick film printing method and therefore the ribs require considerable thickness because these ribs function as gap spacers. However, since respective ribs may be formed in different heights with unevenness at the top area thereof, there also arises a problem that flatness cannot be obtained when the microsheet glass 205 is placed in contact on the rib tops.

While the plasma cell must be processed under a higher temperature, the liquid crystal cell may be processed under a comparatively lower temperature. For this reason, the plasma cell is first processed and thereafter the liquid crystal cell is bonded as shown in FIG. 9. In this case, since the flatness of the microsheet glass 205 cannot be obtained, a problem occurs that the thickness of the liquid crystal layer 206 fluctuates for over the display surface. If the thickness of the liquid crystal layer 206 is not uniform, adverse effects may occur in the operation characteristic, resulting in the possibility of an inconsistent display.

SUMMARY OF THE INVENTION

In view of overcoming the problems of a plasma addressed electro-optical device explained above, it is an object of the present invention to realize flatness of a microsheet glass which is used as a separation sheet. In order to attain this object, dummy barrier ribs are provided on the glass substrate so that the microsheet glass is supported at the external side of the frit seal of the plasma cell, the first seal being formed using a low melting point glass.

In accordance with the present invention, there is provided a plasma addressed electro-optical device which comprises a first substrate having, on one principal surface, a plurality of first electrodes arranged substantially in parallel with each other, a second substrate having, on the principal surface opposed to the first electrodes on the first substrate, a plurality of second electrodes provided substantially perpendicular to the first electrodes and arranged substantially in parallel with each other, a microsheet glass provided between the first and second substrates, an electro-optical material layer provided between the first substrate and the microsheet glass, a plasma cell formed by bonding the circumferences of the second substrate and the microsheet glass with a low melting point glass material wherein a plurality of barrier ribs are formed along the second electrodes, and dummy barrier ribs provided to support the microsheet glass at the outside of the low melting point glass.

Preferably, the microsheet glass has a thermal expansion coefficient which is almost equal to that of the second substrate.

The top areas of the barrier ribs and dummy ribs are formed to be flat.

The barrier ribs and dummy ribs respectively have their top areas polished in a preferred embodiment.

The electro-optical material layer is formed by a liquid crystal layer in one embodiment.

The microsheet glass has the thickness of 50 μm or less.

The barrier ribs are formed on the second electrodes in one arrangement, although other arrangements of the ribs relative to the electrodes are also possible.

BRIEF DESCRIPTION OF THE DRAWINGS

FIG. 14 is a schematic cross-sectional view illustrating the plasma addressed electro-optical device in relation to the third embodiment of the present invention.

DETAILED DESCRIPTION OF THE PREFERRED EMBODIMENTS

Figure 1:
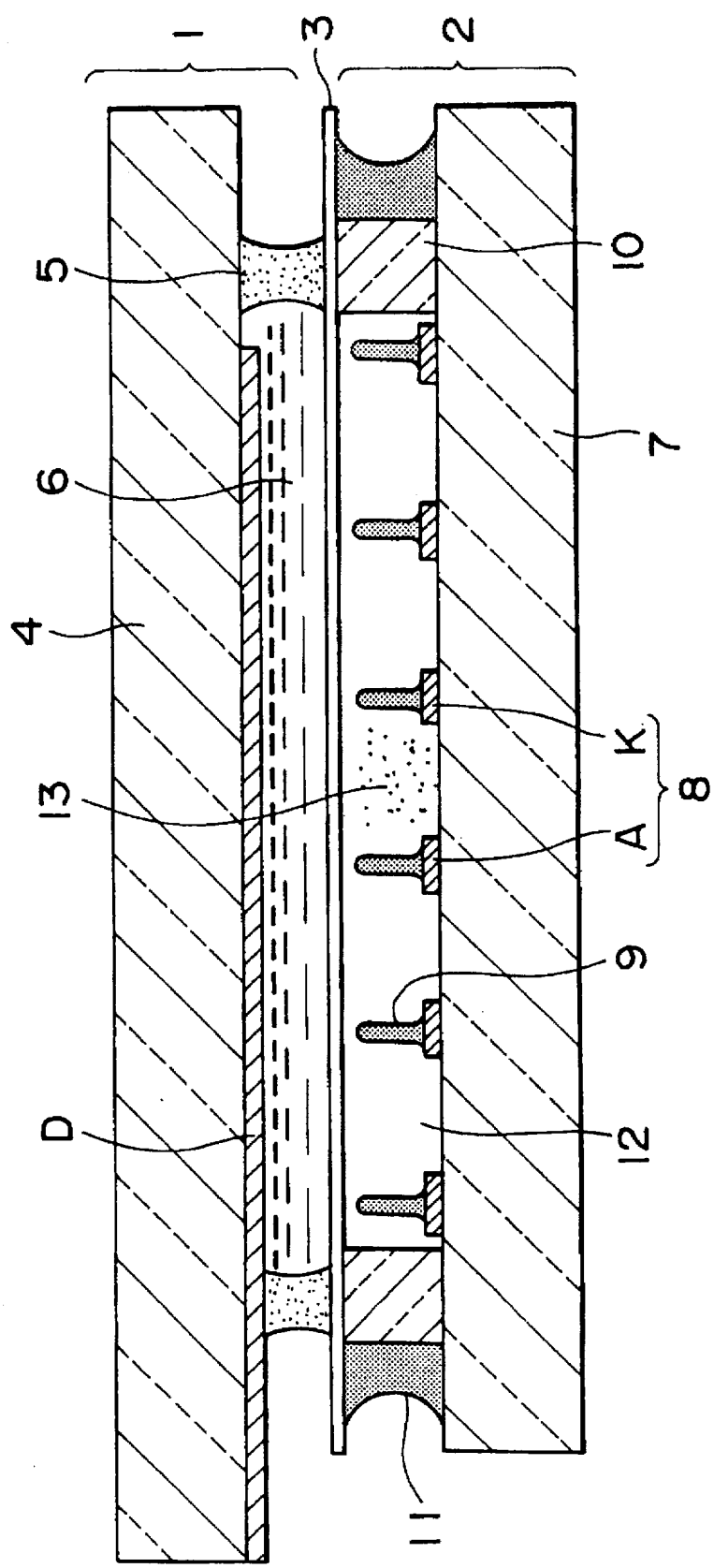
FIG. 1 is a schematic cross-sectional view illustrating a plasma addressed electro-optical device in relation to a first embodiment of the present invention.

The preferred embodiments of the present invention will be explained hereunder in detail with reference to the accompanying drawings. FIG. 1 is a schematic cross-sectional view illustrating an embodiment of a plasma addressed electro-optical device in relation to the first embodiment of the present invention. This device has a structure that a separation sheet consisting of a microsheet glass is laminated between a liquid crystal cell 1 and a plasma cell 2. The microsheet glass 3 must be as thin as possible and has the thickness, for example, of about 50 μm in order to drive the liquid crystal cell. The liquid crystal cell 1 is formed using a first substrate, that is, the glass substrate 4 and a plurality of first electrodes, namely the signal electrodes D' consisting of a transparent conductive film are formed in parallel with each other along the column direction at the internal principal surface thereof. The substrate 4 is bonded to the microsheet glass 3 through the predetermined gap using spacers 5. The gap is filled with an electro-optical material layer, that is, a liquid crystal layer 6. The gap is formed generally of size of about 5 μm and must be kept uniform for the entire part of the display surface. Therefore, although not illustrated in the figure, spacer particle having the predetermined grain size is generally provided within the gap and thereby the gap size can be controlled within an error of about ±0.1 μm. The liquid crystal layer 6 is provided in contact with the signal electrode D and the microsheet glass 3. In the case of this embodiment, liquid crystal is used as an electro-optical material but such material is not limited only thereto and other fluid materials may also be used. In addition, this embodiment relates to a plasma addressed display device, the present invention is not limited thereto and can also be widely applied to a plasma addressed electro-optical device such as an optical modulation device, etc.

Meanwhile, a plasma cell 2 is formed using a second substrate, that is, a lower glass substrate 7. The second electrodes, namely plasma electrodes 8 are formed on the internal principal surface of the glass substrate 7. The plasma electrodes 8 are alternately used as an anode A and a cathode K to generate plasma discharge. These plasma electrodes 8 are arranged in the row direction to cross the signal electrode D. On the plasma electrodes 8, barrier ribs 9 or ribs are formed respectively. A flat spacer 10 is inserted between the glass substrate 7 and the microsheet glass 3. These flat spacers 10 regulate a gap of the plasma cell 2 and have the thickness larger than the height of the barrier ribs 9. For example, the flat spacers are set to the height of 150 μm. In this case, a clearance of about 10 μm is left considering fluctuation of the height of the top areas of the barrier ribs 9 or ribs. As explained above, the top areas of ribs are never placed in contact with the microsheet glass 3. A low melting point glass 11 is provided along the circumference of the glass substrate 7 at the outside of the flat spacer 10 in view of bonding the microsheet glass 3 and glass substrate 7. A hermetically sealed plasma chamber 12 is formed between the microsheet glass 3 and the glass substrate 7. The inside of this plasma chamber 12 is filled with an ionizable gas. A gas seed can be selected from helium, neon, argon or mixed gas of these gas elements. The plasma chamber 12 is divided by barrier ribs 9 or ribs to form each row scanning unit.

When a predetermined voltage is applied across a pair of adjacent plasma electrodes 8, that is, the anode A and cathode K, the gas is selectively ionized to form discharge region 13 where the ionized gas is localized. This discharge region 13 is substantially restricted by the barrier ribs 9 to form a row scanning unit. Each pixel is located at a intersecting point of the discharge region 13 and signal electrode D.

As will be apparent from above explanation, a flat microsheet glass 3 may be bonded by arranging the flat spacer 10 between the microsheet glass 3 and glass substrate 7. Therefore, when the liquid crystal cell 1 is bonded, thickness of the liquid crystal layer 6 can be controlled uniformly.

Figure 2:
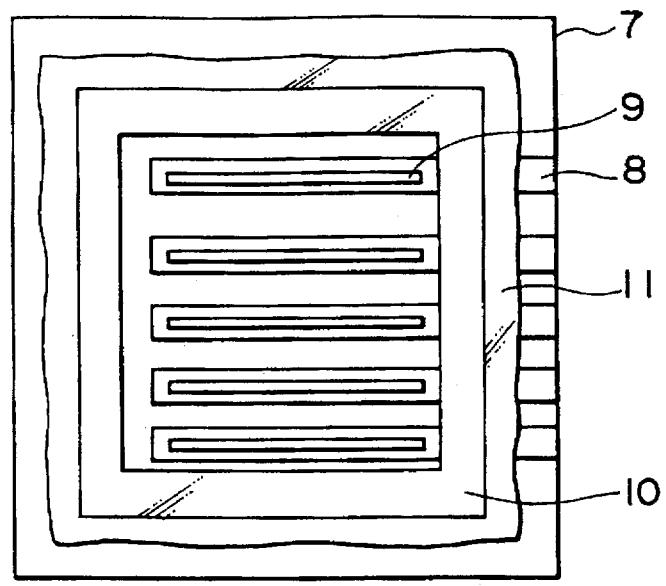
FIG. 2 is a schematic plan view illustrating a structure of a glass substrate used for the device shown in FIG. 1.

FIG. 2 illustrates a plan view of the lower glass substrate 7, that is, a half-completed product under the frit seal condition. On the surface of the glass substrate 7, plasma electrodes 8 and barrier ribs 9 are previously formed in the pre-processing. A flat spacer 10 is also arranged along the circumference of the substrate 7. In this embodiment, as a flat spacer 10, a glass sheet formed like an window-frame having a predetermined thickness is used. A low melting point glass 11 is supplied along the external circumference of the flat spacer 10. In this example, a low melting point glass paste is supplied from a dispenser in such amount that the height of the coated paste exceeds by a little the height of the flat spacer 10.

Figure 3:
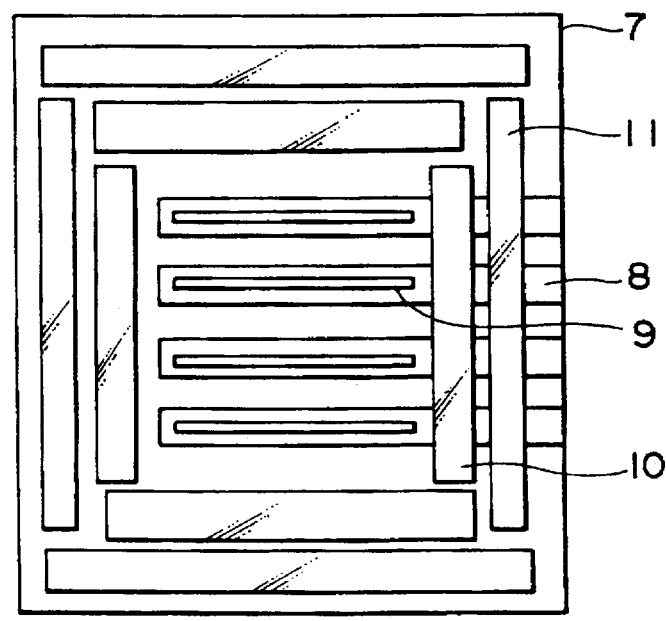
FIG. 3 is a schematic plan view illustrating a modification of the present invention.

FIG. 3 is a schematic plan view illustrating another example of the structure of the glass substrate 7. The elements like those of FIG. 2 are designated by the like reference numerals for better understanding. In this embodiment, elongated narrow flat spacers 10 are used. A plurality of elongated narrow flat spacers are combined to surround the center region of the substrate 7. The elongated narrow flat spacers 10 may be formed more easily than the window-frame type flat spacer explained above resulting in improvement of the manufacturing yield. The elongated narrow flat spacers 10 arranged crossing the plasma electrode 8 can also be deleted. Thereby, fluctuation of flatness resulting from film thickness of the plasma electrode 8 can also be eliminated. Elongated narrow low melting point glass sheets 11 are also arranged in the same manner at the outside of the flat spacers 10. These sheets are previously formed and can be handled more easily than the paste. Thickness of the low melting point glass sheet 11 is set equal to that of the flat spacer 10 or to a value a little larger than that, as explained above. A little clearance exists between the elongated narrow sheets but this clearance does not result in any problem because it is eliminated by thermal fusing when it is within 0.5 mm.

Figure 4:
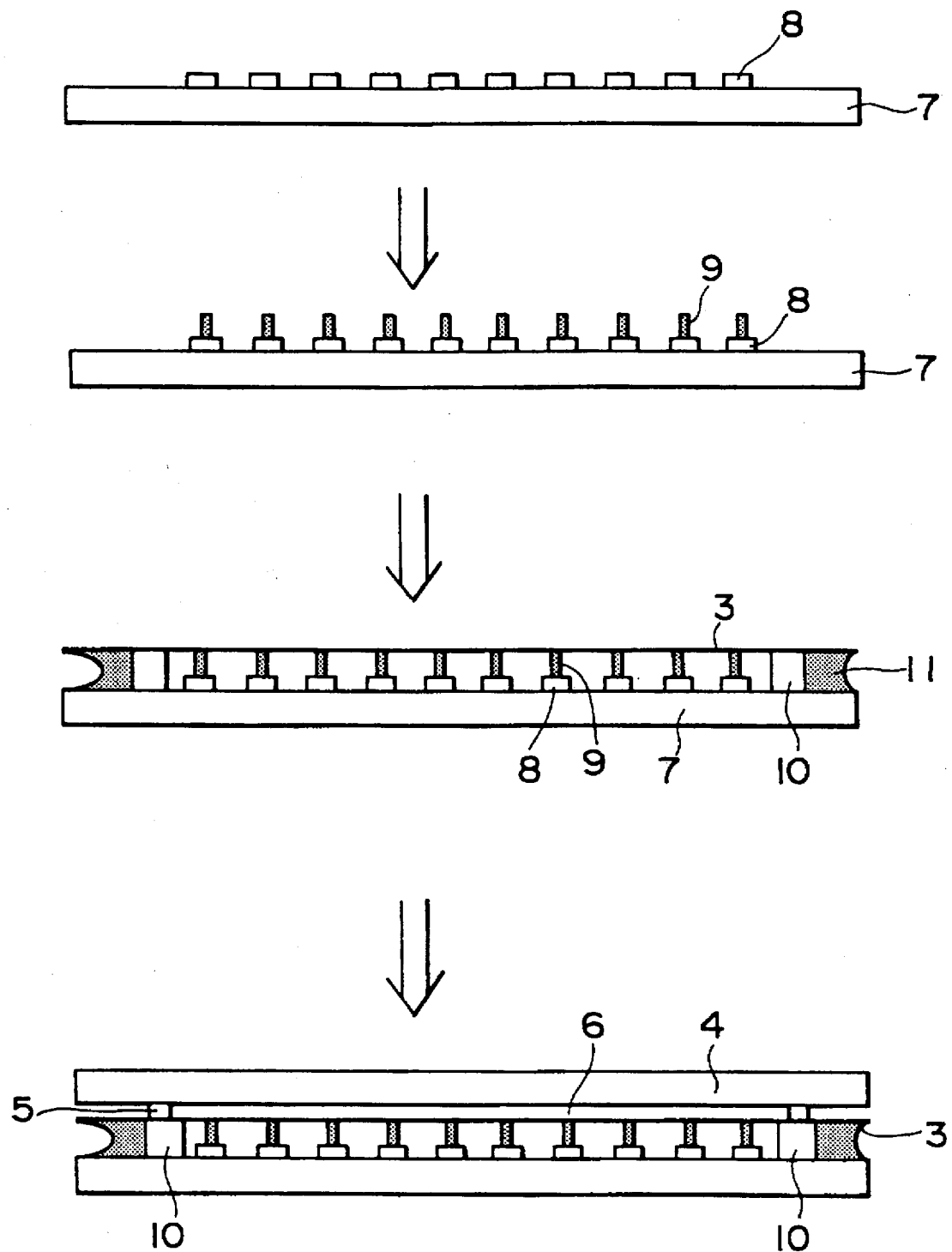
FIG. 4 illustrates the processing steps for showing a method of manufacturing the plasma addressed electro-optical device shown in FIG. 1.

Next, a method of manufacturing a plasma addressed electro-optical device shown in FIG. 1 will be explained with reference to FIG. 4. First, the surface of the glass substrate 7 is coated with an electrode paste and is then fired by the screen printing method to form plasma electrodes 8.

Next, barrier ribs 9 are formed along the plasma electrodes 8 with the screen printing method. In this embodiment, electrodes and barrier ribs are formed by the so-called thick film printing method. Introduction of the printing method assures various merits such as realization of a wider display area of a display device, enlargement of an aperture coefficient and formation of electrodes having a low resistance.

Subsequently, the microsheet glass 3 is thermally fused to the glass substrate 7 by the frit seal process. In this case, a flat spacer 10 is provided between these microsheet glass and glass substrate. Thickness of the spacer is set to a level a little larger than the height of barrier ribs 9 to maintain a gap required for generation of plasma discharge. The microsheet glass 3, glass substrate 7 and flat spacer 10 are integrally frit-sealed with a low melting point glass material 11. In this case, it is preferable that the microsheet glass, glass substrate and flat spacer respectively have an equal thermal expansion coefficient. If there are remarkable difference among the thermal expansion coefficients of three elements, difference is also generated in the compression coefficients because high temperature firing is executed at the time of frit seal process. The microsheet glass generates cracks or breaks, thereby. Moreover, it is preferable for a low melting point glass to have the thermal expansion coefficient which is a little smaller than that of three glass materials. If a low melting point glass has a higher thermal expansion coefficient, a compression coefficient increases, resulting in a risk of generation of cracks in the frit seal and waving deformation in the microsheet glass. Therefore, generation of cracks in the frit seal and adverse effect on the microsheet glass can be eliminated by making small the thermal expansion coefficient of the low melting point glass.

Finally, an upper glass substrate 4 is bonded on the surface of the microsheet glass 3 having sufficient flatness through a seal material consisting of organic bonding agent, etc. or a spacer 5. The gap is filled and sealed with the liquid crystal layer 6 to complete a plasma addressed electro-optical device. Here, it is preferred to spray the spacer particles to uniformly control the thickness of the liquid crystal layer 6. Moreover, it is preferable that the spacer 5 consisting of a bonding agent, etc., is provided along the flat spacer 10. On the occasion of bonding the liquid crystal cell, a high voltage is applied to control the gap, but breakage of the microsheet glass 3 can be prevented effectively because the flat spacer 10 under the microsheet glass 3 works as a supporting structure.

Figure 5:
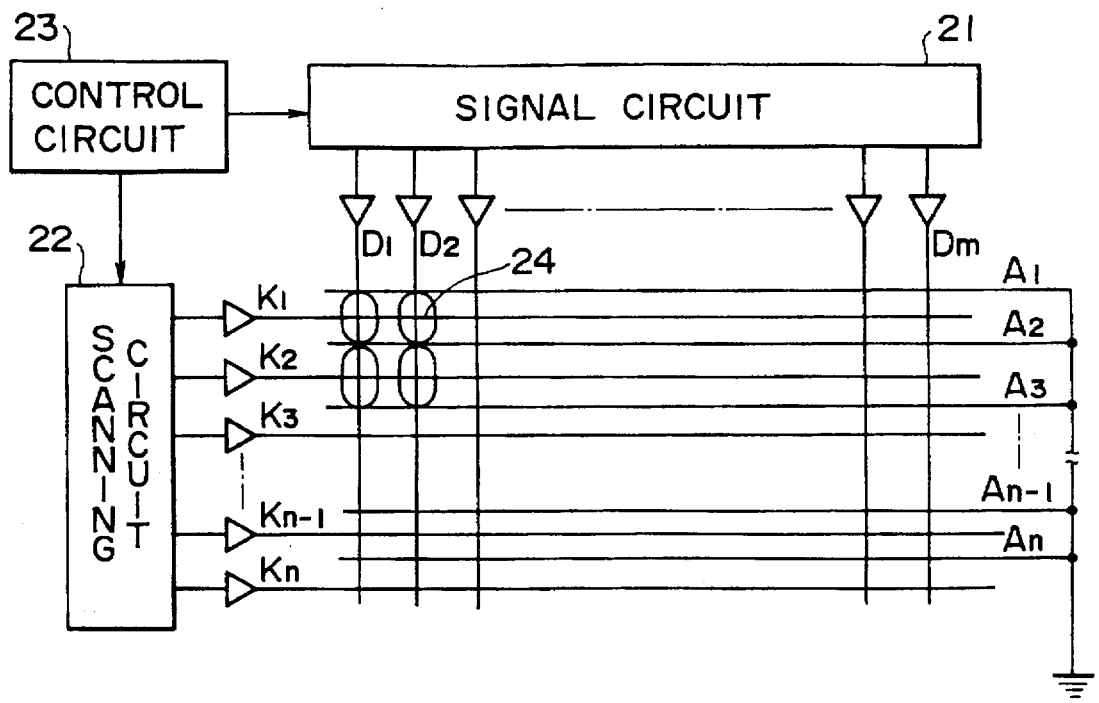
FIG. 5 is a circuit diagram for explaining operations of the plasma addressed electro-optical device.

Operation of the plasma addressed display device will be briefly explained hereunder with reference to FIG. 5. FIG. 5 illustrates an example of a drive circuit used for the display device. This drive circuit is composed of a signal circuit 21, a scanning circuit 22 and a control circuit 23. The signal circuit 21 is connected with signal electrodes D1 to Dm through buffers. Meanwhile, the scanning circuit 22 is connected with cathodes K1 to Kn through buffers. The anodes A1 to An are grounded in common. The cathodes are line-sequentially scanned by the scanning circuit 22, while the signal circuit 21 supplies an analog drive voltage to each signal electrode in synchronization with the scanning. The control circuit 23 synchronously controls the signal circuit 21 and scanning circuit 22. The discharge region is formed along each cathode as a row scanning unit. On the other hand, each signal electrode becomes a column drive unit. A pixel 24 is specified between both units.

Figure 6:
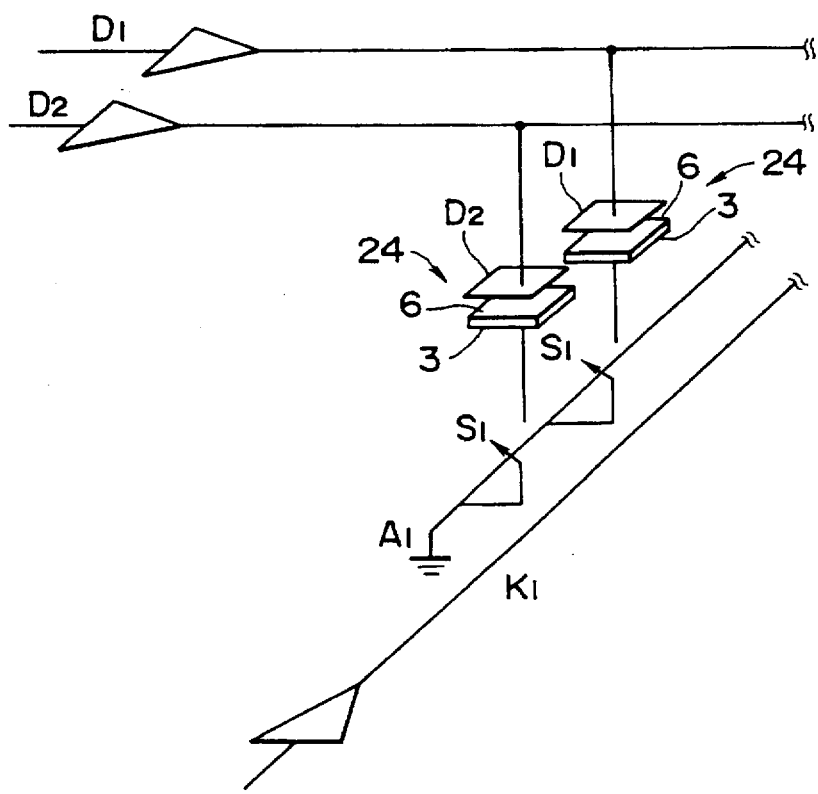
FIG. 6 is a schematic diagram of pixels cutout from the plasma addressed electro-optical device.
Figure 7:
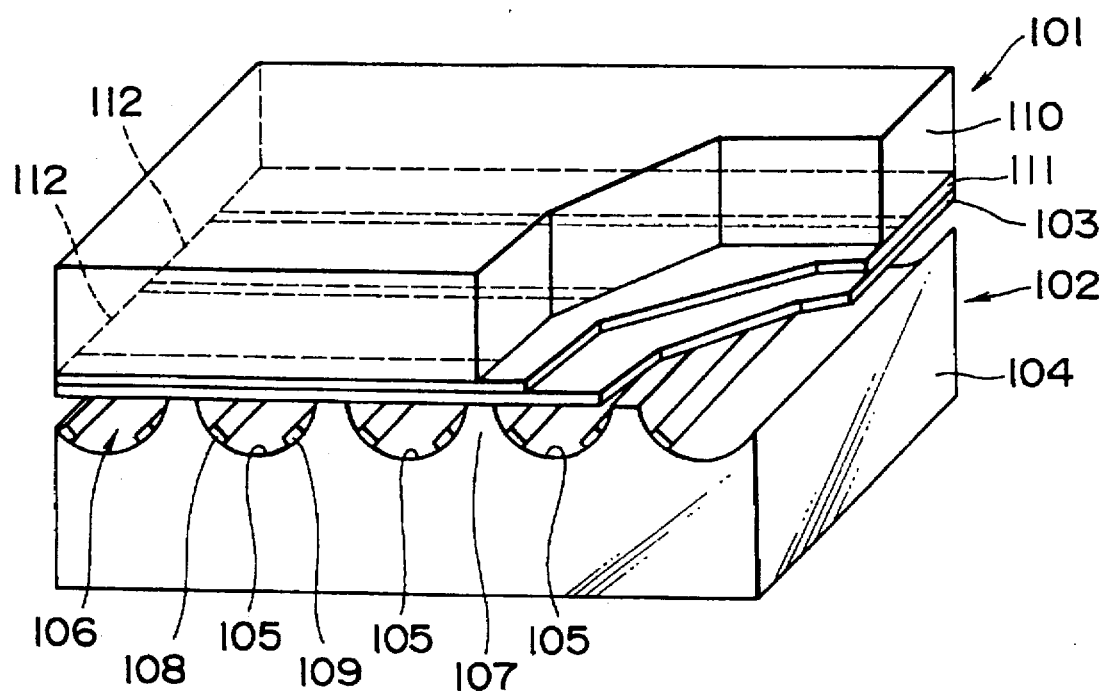
FIG. 7 is a perspective view illustrating an example of the existing plasma addressed electro-optical device.
Figure 8:
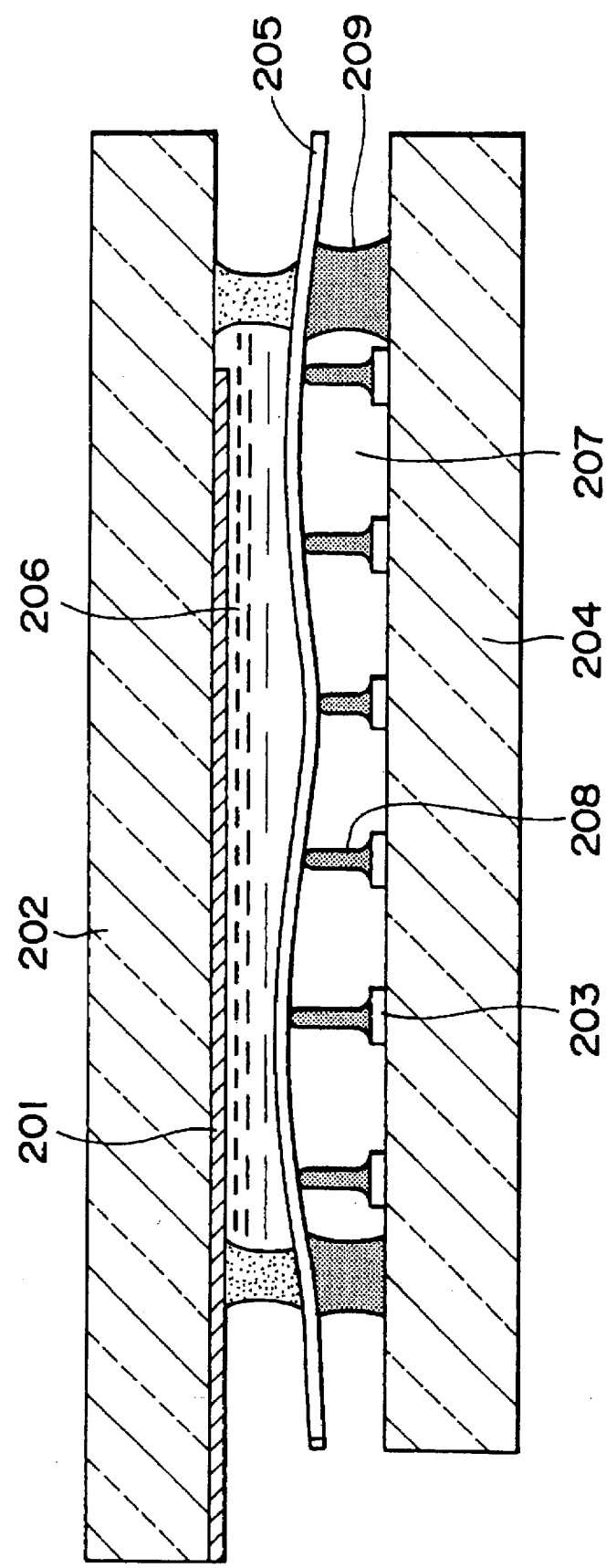
FIG. 8 is a schematic cross-sectional view illustrating a plasma addressed electro-optical device proposed previously.
Figure 9:
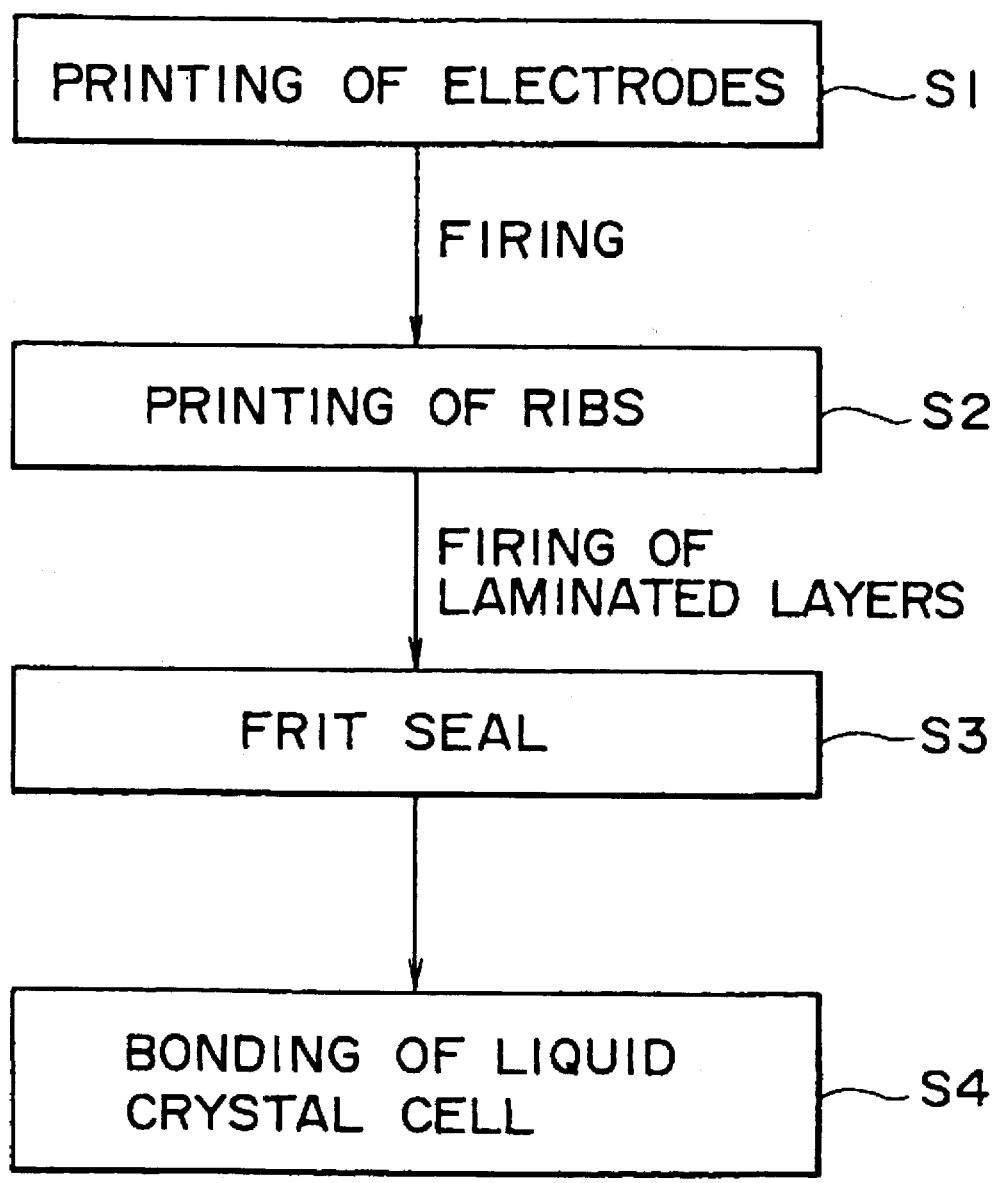
FIG. 9 is a flowchart showing a method of manufacturing the device illustrated in FIG. 8.

FIG. 6 schematically illustrates two pixels shown in FIG. 5. Each pixel 24 is formed by a serial connection of a sampling capacitor consisting of the liquid crystal layer 6 held by the signal electrodes (D1, D2) and the microsheet glass 3 and a plasma sampling switch S1. The plasma sampling switch S1 equivalently illustrates the function of the discharge region. That is, when the discharge region is activated, the inside thereof is almost totally connected to the anode potential. Meanwhile, when the plasma discharge is terminated, the discharge region is left at the floating potential. An analog drive voltage is stored in the sampling capacitor of each pixel through the sampling switch S1 for the so-called sampling hold. Each pixel 24 can be controlled in various gradations to light or go out depending on levels of the analog drive voltage.

Figure 10:
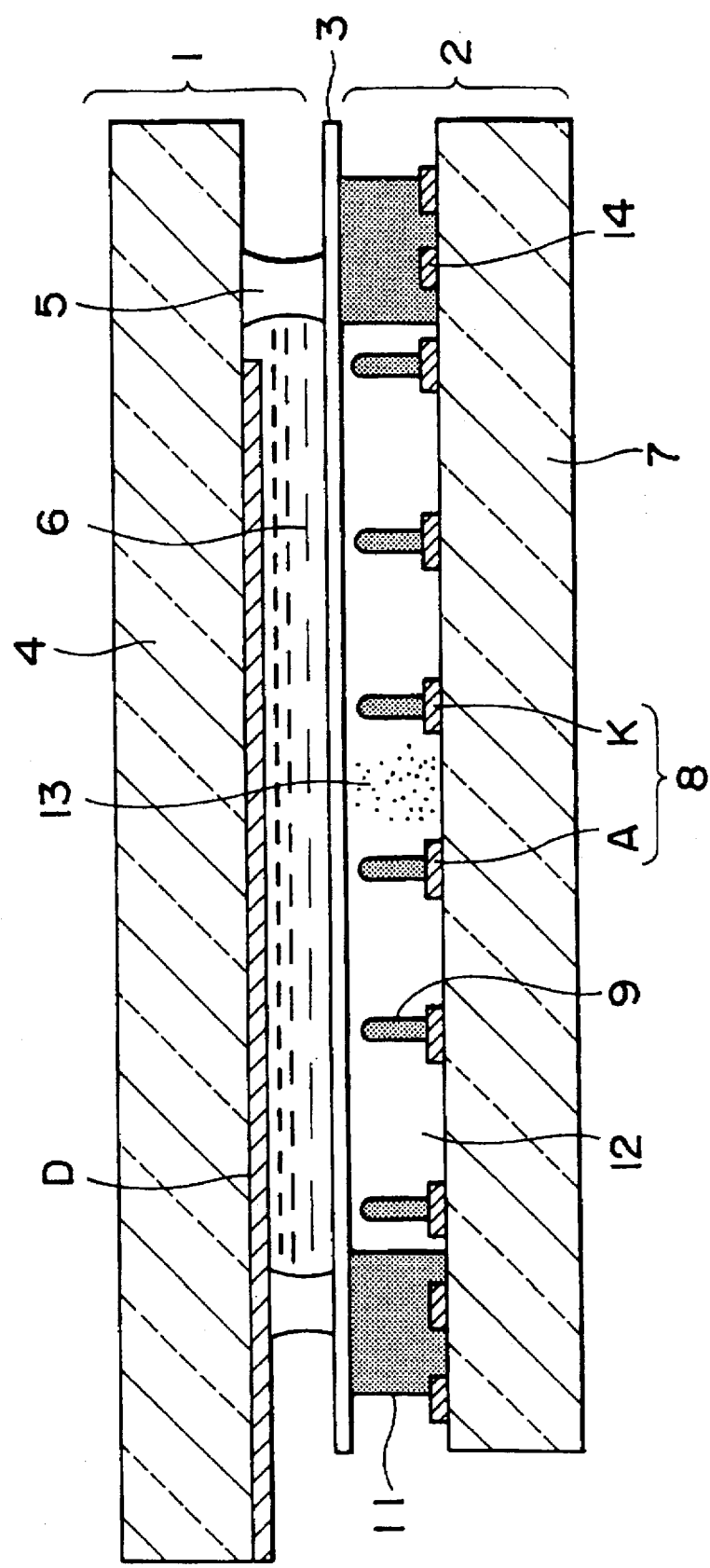
FIG. 10 is a schematic cross-sectional view illustrating a plasma addressed electro-optical device in relation to the second embodiment of the present invention.

FIG. 10 is a schematic cross-sectional view illustrating the second embodiment of the plasma addressed electro-optical device. This device has a structure that a liquid crystal cell 1, a plasma cell 2 and a separation sheet consisting of a microsheet glass 3 provided between these cells are laminated. The microsheet glass 3 is required to be as thin as possible to drive the liquid crystal cell. For instance, this microsheet glass has the thickness of about 50 µm. The liquid crystal cell 1 is formed using the first substrate 1, that is, the glass substrate 4 and a plurality of first electrodes consisting of transparent conductive film, that is, signal electrodes D are formed in parallel with each other along the column direction on the internal principal surface of the glass substrate 4. The substrate 4 is bonded on the microsheet glass 3 through the predetermined gap using the spacer 5. The gap is filled with an electro-optical material layer, that is, the liquid crystal layer 6. This gap usually has a size of about 5 µm and it must be kept uniform for the entire part of the display surface. For this purpose, although not illustrated, the inside of gap is usually sprayed with spacer particles having the predetermined grain size. Thereby, size of gap can be controlled within an error of about ±0.1 µm. The liquid crystal layer 6 is placed in surface contact with the signal electrodes D and microsheet glass 3. In this embodiment, liquid crystal is used as an electro-optical material, but there is no particular limitation and another fluid material can also be used. Moreover, this embodiment relates to a plasma addressed display device, but it is not limited thereto and can also be applied to plasma addressed electro-optical device of wider range such as an optical modulation device, etc.

On the other hand, the plasma cell 2 is formed using a second substrate, that is, a lower glass substrate 7. The second electrode, namely, the plasma electrodes 8 are formed on the internal principal surface of the glass substrate 7. The plasma electrodes 8 are alternately function as the anodes A and cathodes K to generate plasma discharge. The plasma electrodes 8 are arranged in the row direction crossing the signal electrodes D. The barrier ribs 9 or ribs are formed along the surface of plasma electrodes 8.

Moreover, dummy electrodes 14 are formed in the same shape as the plasma electrodes 8 in the periphery of the substrate in both sides of the plasma electrode group. These dummy electrodes 14 work as the lower layers of the low melting point frit seal and are arranged to ensure better flatness. A rod-shaped low melting point glass 11 is arranged on the dummy electrodes 14 for the purpose of bonding the microsheet glass 3 and glass substrate 7. The bonding can be realized with good sealing condition and flatness, keeping preferable clearance by setting the thickness of the rod-shaped low melting point glass 11 to 1.2 to 1.4 times the height of the ribs. Thus, a hermetically sealed plasma chamber 12 can be formed between the bonded substrate 7 and microsheet glass 3. The inside of this plasma chamber 12 is filled with an ionizable gas. A gas seed can be selected, for example, from helium, neon, argon or a mixed gas of these gas elements. The plasma chamber 12 is divided by the barrier ribs 9 or ribs to form row scanning units.

When the predetermined voltage is applied across a pair of adjacent plasma electrodes 8, that is, an anode A and a cathode K, the filled gas is selectively ionized to form a discharge region 13 where the ionized gas is localized. This discharge region 13 is substantially restricted by the barrier ribs 9 to form a row scanning unit. Each pixel is located at the intersecting point of the discharge region 13 and a signal electrode D.

As will be apparent from the above explanation, the microsheet glass 3 can be bonded keeping the flatness thereof by providing a rod type or elongated narrow low melting point glass 11 as a sealing material between the microsheet glass 3 and glass substrate 7. Therefore, when the liquid crystal cell 1 is bonded, the thickness of the liquid crystal layer 6 can be controlled uniformly.

Figure 11:
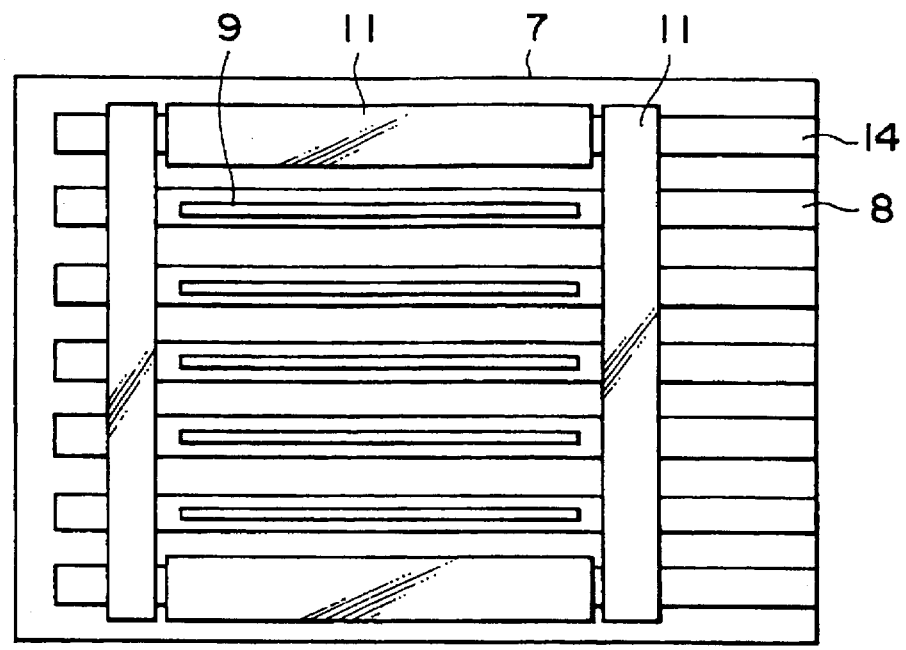
FIG. 11 is a schematic plan view illustrating a structure of the glass substrate used for the device shown in FIG. 10.

FIG. 11 is a schematic plan view during the frit seal process illustrating the surface diagram of the lower glass substrate 7. On the surface of the glass substrate 7, the plasma electrodes 8, barrier ribs 9 and dummy electrodes 14 are previously formed by the pre-processing. In this case, the plasma electrodes 8 and dummy electrodes 14 must be formed in the same shape and of the same material. Different shapes or materials result in difference of heights, generating difference of surface levels. The elongated narrow low melting point glass material sheets or rods 11 having the predetermined thickness are arranged in the periphery of of the substrate 7. The low melting point glass material rod 11 preferably has the thermal expansion coefficient which is equal to or a little smaller than that of the substrate glass 7 and also has the thickness about 1.2 to 1.4 times the height of the barrier ribs 9. In this embodiment, elongated narrow low melting point glass rods 11 are used. A plurality of elongated narrow low melting point glass rods are combined to surround the center region of the substrate 7. This low melting point glass rods may be dealt with easier than the paste and provides an advantage for realization of large size display area. In such a manner, the microsheet glass can be bonded keeping excellent flatness.

Figure 12:
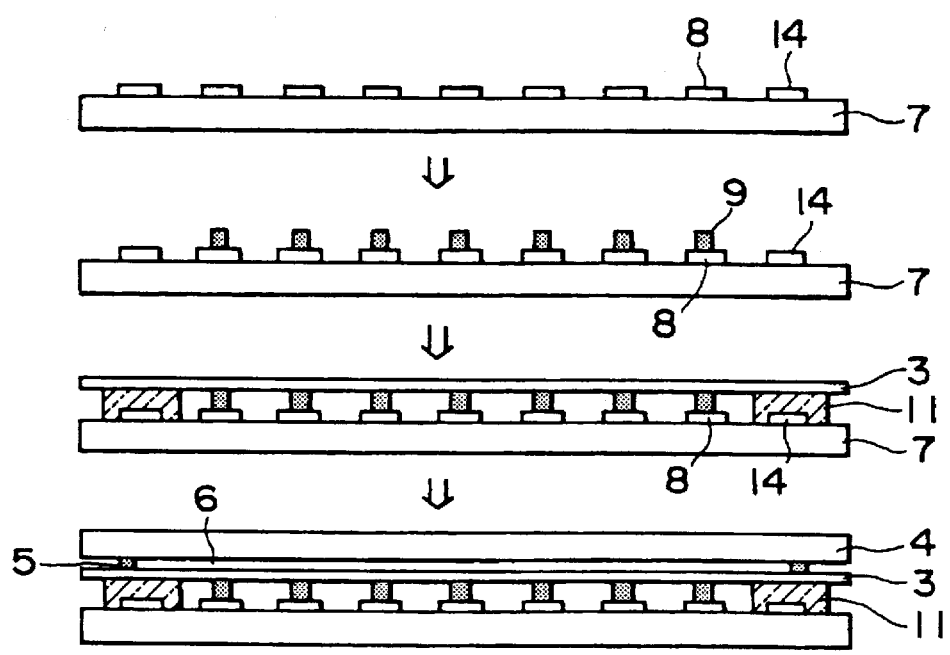
FIG. 12 illustrates the processing steps for showing a method of manufacturing the plasma addressed electro-optical device shown in FIG. 10.

A method of manufacturing a plasma addressed electro-optical device shown in FIG. 10 will then be explained hereunder with reference to FIG. 12. First, the surface of a glass substrate 7 is coated with electrode paste using the screen printing method and is then fired to simultaneously form plasma electrodes 8 and dummy electrodes 14.

Next, the barrier ribs 9 are formed along the surface of the plasma electrodes 8 with the same screen printing method. In this embodiment, the electrodes and barrier ribs are formed by so-called thick film printing method. Use of the printing method provides various advantages that a large size display area of a display device can be realized, thereby enlargement of an aperture coefficient can also be achieved and electrodes having a low resistance can be formed.

Subsequently, the microsheet glass 3 is thermally fused to the glass substrate 7 by the frit seal. In this case, a low melting point glass rod 11 is used as the frit. Thickness of the low melting point glass rod 11 is set to 1.2 to 1.4 times the height of the barrier ribs 9. Here, it preferable that the microsheet glass 3 has the thermal expansion coefficient which is equal to that of the glass substrate 7. If there is a remarkable difference between the thermal expansion coefficients of both materials, a difference is also generated in the expansion or compression coefficients because the high temperature firing is executed during the frit seal process, resulting in cracks or breaks of the microsheet glass 3. Moreover, it is also preferable that the thermal expansion coefficient of the low melting point glass rod 11 is a little smaller than that of two glass materials explained above. If the low melting point glass rod has the thermal expansion coefficient which is larger than that of such microsheet glass and glass substrate, a compression coefficient increases, resulting in a risk of cracks of frit seal or waving deformation of the microsheet glass. Therefore, cracking of the frit seal or adverse effects on the microsheet glass can be eliminated by making small the thermal expansion coefficient of the low melting point glass rod.

Finally, an upper glass substrate 4 is bonded on the surface of the microsheet glass 3 keeping the flatness through a seal material consisting of an organic bonding agent, etc., or spacer 5. A gap is filled with a liquid crystal layer 6 to complete a device. Here, the spacer particle may be sprayed to uniformly control the thickness of the liquid crystal layer 6. The spacer 5 consisting of a bonding agent, etc. is preferably provided along the low melting point glass 11. On the occasion of bonding the liquid crystal cell, a high voltage is applied for gap control, but the low melting point glass 11 provided under the microsheet glass 3 is used as a supporting base to effectively prevent breaks of the microsheet glass 3.

Figure 13:
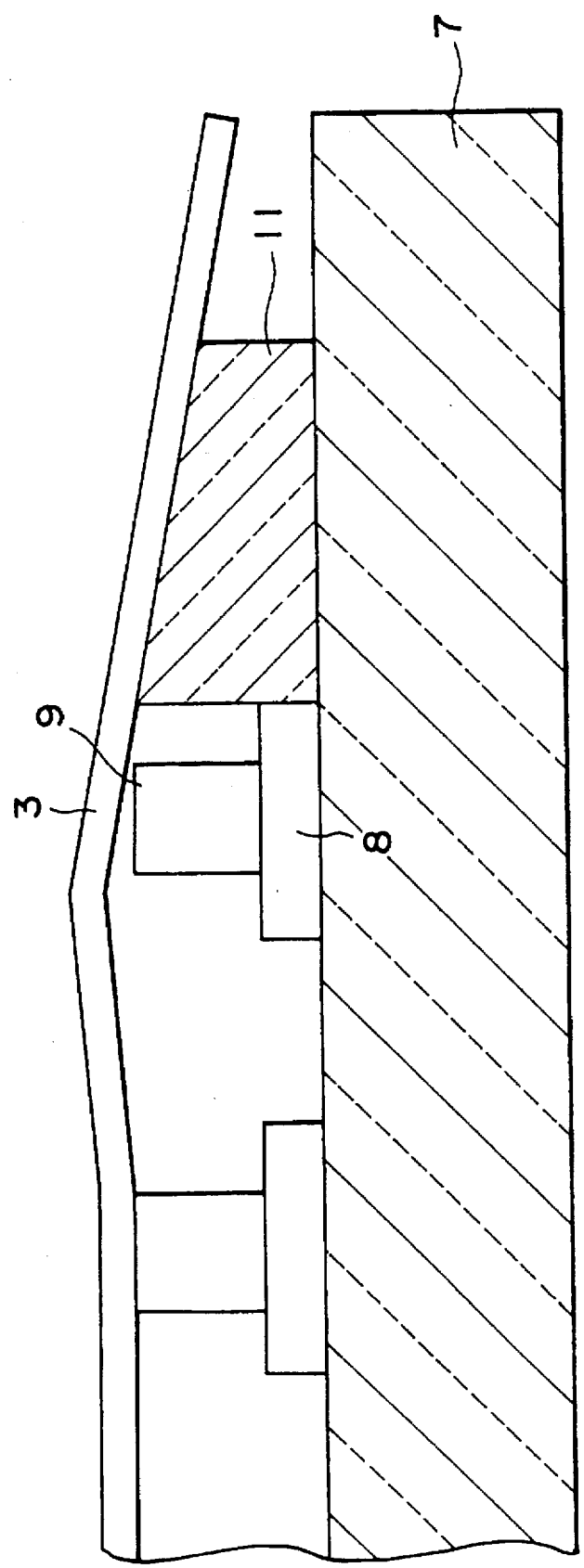
FIG. 13 is a schematic diagram for explaining the portions to be improved of the plasma address electro-optical device in relation to the second embodiment of the present invention.

Next, a third embodiment of the plasma addressed electro-optical device will the explained. The third embodiment has been achieved by further improving the plasma addressed electro-optical device of the second embodiment already explained previously. In view of easily understanding the third embodiment, various points to be further improved of the second embodiment will briefly be explained with reference to FIG. 13. As illustrated in FIG. 13, the microsheet glass 3 and glass substrate 7 are bonded with each other with a low melting point glass rod 11. However, this low melting point glass rod 11 becomes soft and is deformed when it is heated up to a higher temperature during the heat treatment. Since the frit seal is executed while a pressure is applied, it is difficult to avoid deformation of the microsheet glass and therefore the end portion of microsheet glass 3 is inclined toward the external side. For this reason, the microsheet glass 3 is partially projected along the internal circumference of the frit seal, making it difficult to maintain the flatness thereof. It is therefore an object of this embodiment to keep the flatness for the entire part of the display surface by eliminating unevenness which may be partially left.

FIG. 14 is a schematic cross-sectional view illustrating the third embodiment of the plasma addressed electro-optical device. This device has a structure that a liquid crystal cell 1, a plasma cell 2 and a separation sheet consisting of a microsheet glass 3 provided between above cells are laminated. The microsheet glass 3 has to be as thin as possible to drive the liquid crystal cell and has the thickness, for example, of about 50 μm. The liquid crystal cell 1 is formed using the glass substrate 4 and a plurality of signal electrodes D consisting of transparent conductive film are formed in parallel with each other along the column direction on the internal principal surface of the glass substrate 4. The substrate 4 is bonded to the microsheet glass 3 through the predetermined gap using a spacer 5. The gap is filled with the liquid crystal layer 6. The gap usually has a size of about 5 μm and has to be kept uniform for the entire part of the display surface. For this purpose, although not illustrated, the spacer particles having the predetermined grain size are usually sprayed in the gap. Therefore, the size of gap can be controlled within an error of about ±0.1 μm. The liquid crystal layer 6 is placed in surface-contact with the signal electrodes D and microsheet glass 3.

Meanwhile, the plasma cell 2 is formed using a lower glass substrate 7. The plasma electrodes 8 are formed on the internal principal surface of the glass substrate 7. The plasma electrodes 8 alternately function as an anode A and a cathode K to generate plasma discharge. The plasma electrodes 8 are arranged along the row direction to cross the signal electrodes D. The barrier ribs 9 or ribs are formed along the surface of the plasma electrodes 8. Moreover, the dummy electrodes 14 are also formed in the same shape as the plasma electrodes 8 in the periphery of the substrate of both sides of the plasma electrode group. The dummy barrier ribs 15 are also formed along the upper surface of the dummy electrodes 14. These dummy ribs 15 are formed of the same material in the same size and shape as the ordinary barrier ribs 9. However, the dummy barrier ribs 15 are partially eliminated and the region where only the dummy electrode 14 is exposed is provided. The region surrounded by the external dummy rib 15 and internal ordinary barrier rib 9 forms the continuous space. This space is filled with the low melting point glass 11 and the microsheet glass 3 and the glass substrate 7 are bonded. As is obvious apparent from this structure, the size of gap between the microsheet glass 3 and glass substrate 7 is regulated to be constant by the barrier ribs 9. That is, in this embodiment, the top areas of the barrier ribs 9 are formed flat by the polishing process to keep the flatness of the microsheet glass 3. A hermetically sealed plasma chamber 12 is formed between the substrate 7 and microsheet glass 3 bonded with each other by the low melting point glass 11. The inside of this plasma chamber 12 is filled with an ionizable gas. A gas seed may be selected, for example, from helium, neon, argon xenon or a mixed gas of these gas elements. The plasma chamber 12 is divided by the barrier ribs 9 or ribs to form the row scanning units.

When the predetermined voltage is applied across a pair of adjacent plasma electrodes 8, that is, an anode A and a cathode K, the filled gas is selectively ionized to form a discharge region 13 where the ionized gas is located. This discharge region 13 is substantially restricted by the barrier ribs 9 to form row scanning units. Each pixel is located at the intersecting point of the discharge region 13 and signal electrodes D.

Figure 15A:
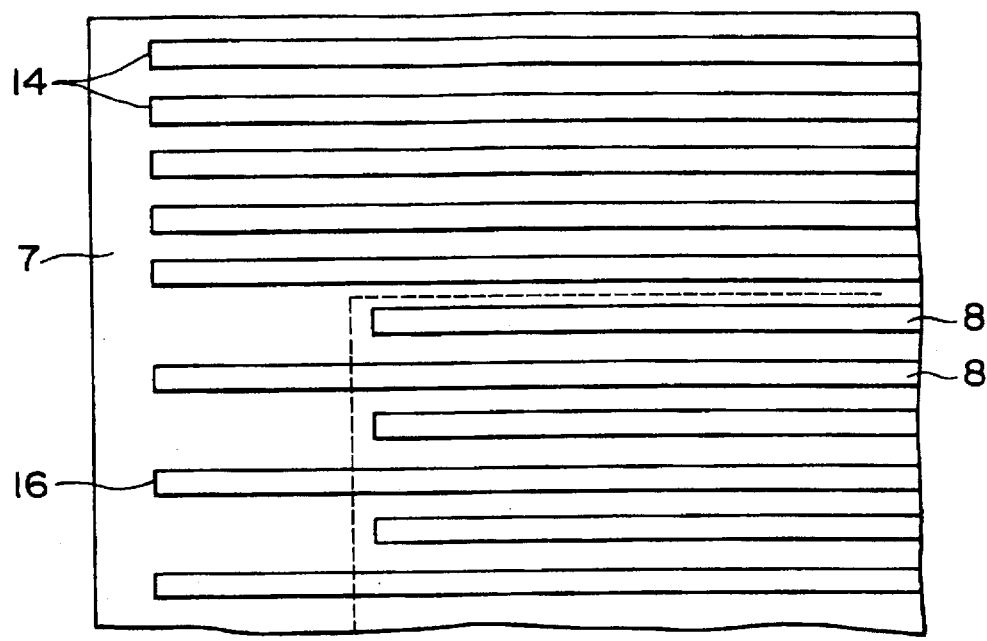
FIGS. 15A and 15B are schematic partial plan views illustrating a structure of the glass substrate used for the device shown in FIG. 14.
Figure 15B:
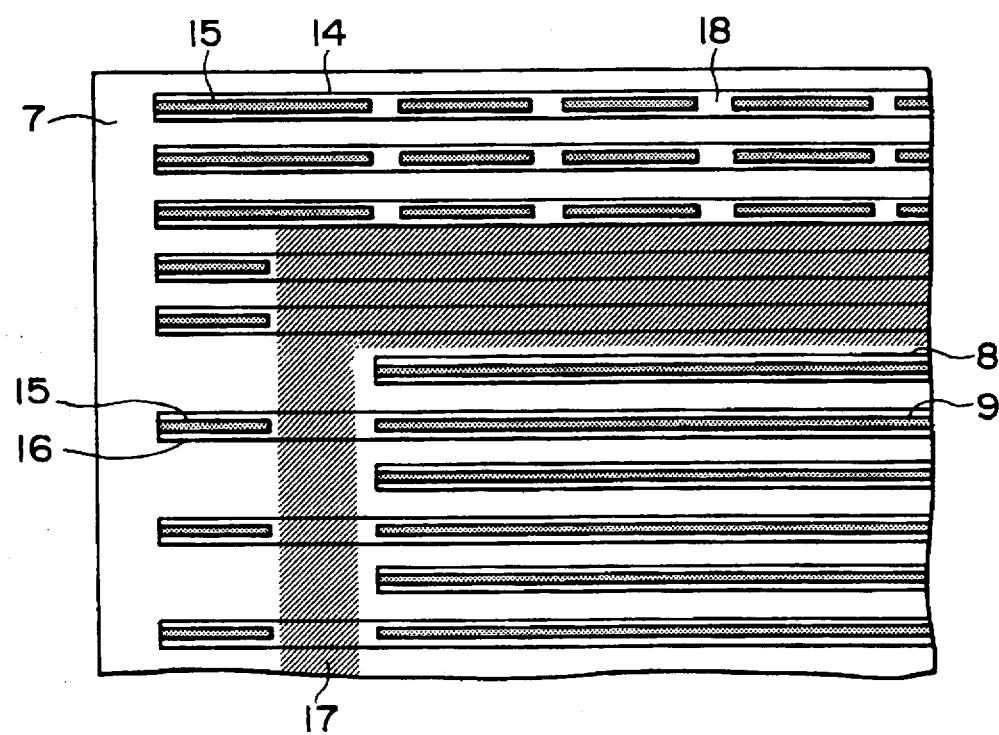

FIGS. 15A and 15B are partial plan views illustrating pattern formats of the plasma cell glass substrate 7. FIG. 15A illustrates an electrode pattern format, while FIG. 15B, a barrier rib pattern format. As illustrated in FIG. 15A, a plurality of plasma electrode stripes 8 are formed at the internal display surface region surrounded by a dotted line. The end portions of the plasma electrodes 8 are alternately extended to form the lead-out electrodes 16 for connection outside the display matrix. In the same manner, the dummy electrode stripes 14 are formed in the peripheral region located at the external side of the dotted line as explained previously.

As shown in FIG. 15B, the ordinary barrier ribs 9 are formed along the plasma electrodes 8. Moreover, the dummy barrier ribs 15 are also formed along the surfaces of the dummy electrodes 14 and lead-out electrodes 16. These dummy barrier ribs 15 are partially eliminated along the peripheral region of the glass substrate 7 to form a continuous space 17. The glass substrate 7 and microsheet glass are bonded with each other by filling such space 17 with a low melting point glass material. A low melting point glass paste can be supplied to this space 17 using a dispenser, etc. In this case, the dummy barrier ribs 15 function as a bank for preventing outflow of the glass paste. Moreover, in the case of supplying a solid low melting point glass formed in a shape of an elongated narrow sheet, the dummy barrier ribs 15 function as a stopper for positioning guidance. The dummy barrier ribs 15 formed along the dummy electrodes 14 are partially provided with cutout portions 18 so that an extra part generated by fluctuation in the amount of supplied low melting point glass may be released to the external side through such cutout portions 18. Therefore, flatness can be maintained along the frit seal.

Figure 16:
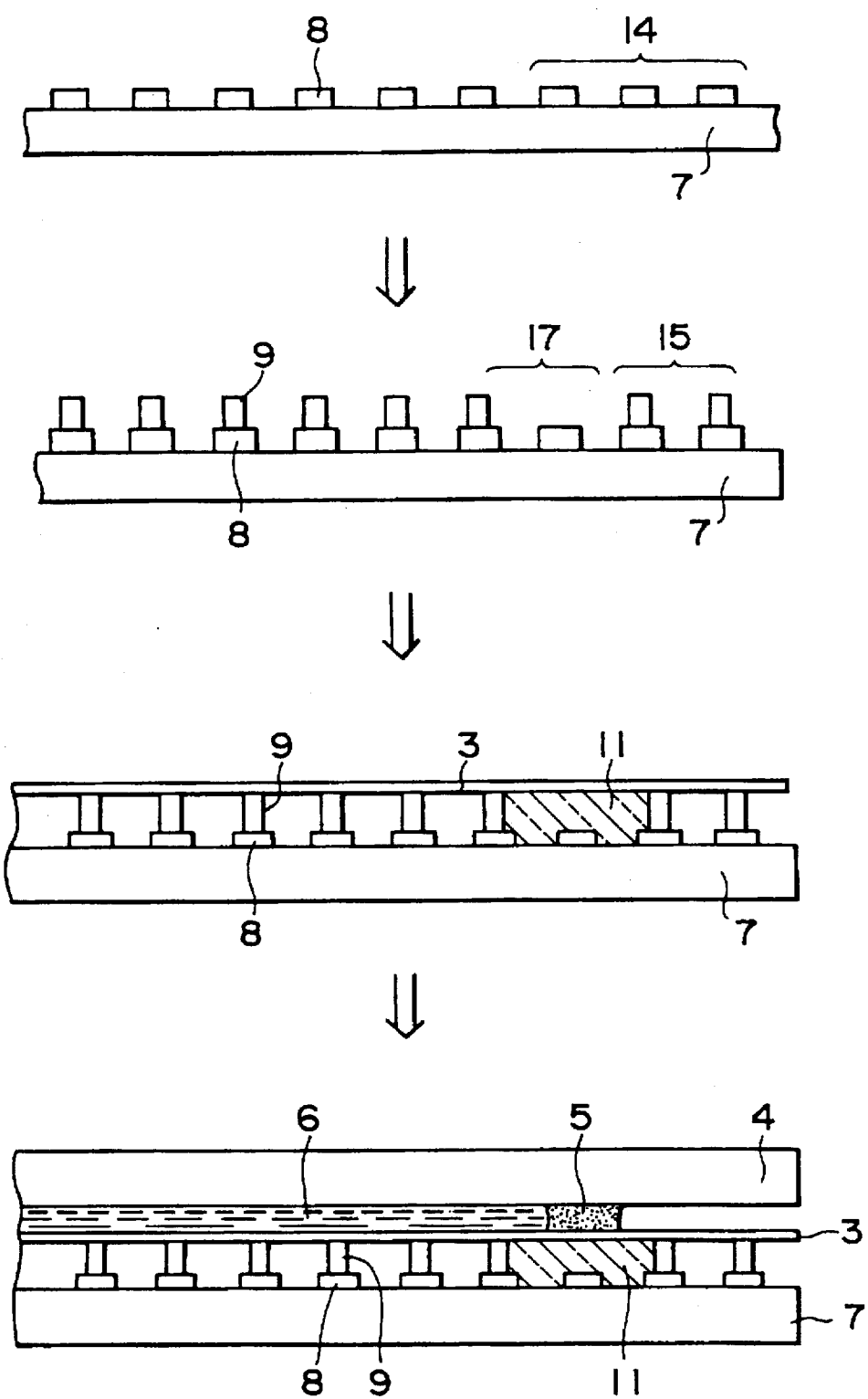
FIG. 16 illustrates the processing steps for showing a method of manufacturing the plasma addressed electro-optical device shown in FIG. 14.

A method of manufacturing the plasma addressed electro-optical device shown in FIG. 14 will be explained with reference to FIG. 16. First, the surface of glass substrate 7 is coated with an electrode paste by the screen printing method and is then fired to simultaneously form the plasma electrodes 8 and dummy electrodes 14.

Next, ordinary barrier ribs 9 are formed along the upper surfaces of the plasma electrodes 8 and the dummy barrier ribs 15 are formed along the surfaces of the dummy electrodes 14 also by the screen printing method. In this case, the dummy barrier ribs 15 are partially eliminated to reserve the space 17 for the frit seal. In this embodiment, the electrodes and barrier ribs are formed by the so-called thick film printing method. Use of the printing method provides various merits advantages that a large size display area of a display device can be realized, an opening coefficient can be enlarged and an electrode having a low resistance can be formed. Here, the barrier ribs 9 or ribs are formed by the thick film printing method, but such barrier ribs require considerable thickness because the ribs function as the gap spacer. However, heights of the ribs fluctuate and the top area of each rib has an uneven surface. Therefore, in this embodiment, the top surface of the rib is flattened by the polishing process after the firing of thick film printing.

Subsequently, a sufficient amount of low melting point glass 11 is supplied to the space 17 as explained above and the microsheet glass 3 is placed in surface contact with the flat top areas of the ribs. Under this condition, heat treatment is carried out under the pressurized condition to thermally fuse the microsheet glass 3 to the glass substrate 7 by the frit seal processing. In this case, if there is a remarkable difference in the thermal expansion coefficients of these materials, difference is also generated in the expansion or compression coefficients because the high temperature firing is performed during the frit sealing process, resulting in cracks or breaks of the microsheet glass 3.

Finally, an upper glass substrate 4 is bonded on the surface of the microsheet glass 3 keeping the flatness through a sealing material consisting of an organic bonding agent, etc. or a spacer 5. The gap is filled with the liquid crystal layer 6 to complete a device. Here, the spacer particle may be sprayed to uniformly control the thickness of the liquid crystal layer 6. The spacer 5 consisting of a bonding agent is preferable to be provided along the low melting point glass 11. At the time of bonding the liquid crystal cell, high pressure is applied for gap control, but the low melting point glass 11 provided under the microsheet glass 3 works as the supporting base to effectively prevent breaks in the microsheet glass 3.

Figure 17:
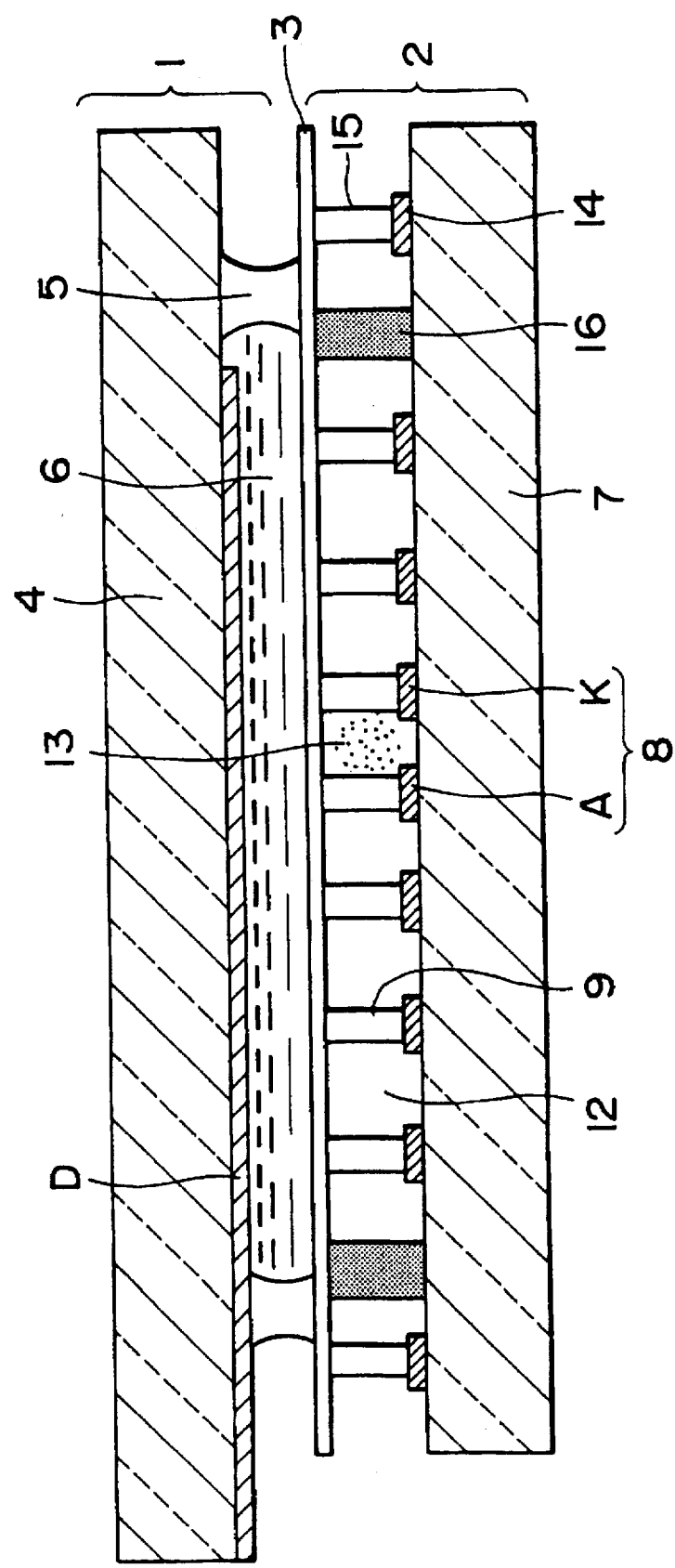
FIG. 17 is a schematic cross-sectional view illustrating the plasma addressed electro-optical device in relation to the fourth embodiment of the present invention.

A fourth embodiment of the plasma addressed electro-optical device of the present invention will be explained with reference to FIG. 17. This device is similar to the third embodiment, except for only the sealing structure. The plasma cell of this embodiment realizes the frit seal between the microsheet glass 3 and glass substrate 7 using a low melting point glass 16. At the external side of the frit seal area, the dummy barrier ribs 15 are formed on the glass substrate 7 through the dummy electrodes 14 in order to support the microsheet glass 3. Here, the dummy barrier ribs are formed on the dummy electrodes to keep constant the height, but the lead-out electrodes made of Ag may be formed on the glass substrate 7 or the dummy barrier ribs may be formed in direct on the glass substrate. In any case, the dummy barrier ribs are provided at the outside of the frit seal in order to support the microsheet glass having the thickness of about 50 μm or more.

What is claimed is:

1. A plasma addressed electro-optical device, comprising:
   a first substrate having a plurality of first electrodes arranged substantially in parallel with each other on one principal surface thereof;
   a second substrate having a plurality of second electrodes arranged substantially in parallel with each other crossing said first electrodes on the principal surface of said first substrate opposed to said first electrodes;
   a microsheet glass provided between said first and second substrates;

electro-optical material layer provided between said first substrate and said microsheet glass;

a plasma cell formed by bonding circumferential portions of said second substrate and said microsheet glass with a low melting point glass, said plasma cell including a plurality of barrier ribs formed along the surfaces of said second electrodes; and dummy barrier ribs provided on said second substrate at an external side of said low melting point glass to support portions of said microsheet glass that extend beyond said low melting point glass.

2. A plasma addressed electro-optical device according to claim 1, wherein the thermal expansion coefficient of said microsheet glass is equal to that of said second substrate.

3. A plasma addressed electro-optical device according to claim 1, wherein the top areas of said barrier ribs and dummy ribs are flattened.

4. A plasma addressed electro-optical device according to claim 1, wherein said barrier ribs and dummy ribs respectively have the polished top areas.

5. A plasma addressed electro-optical device according to claim 1, wherein said electro-optical material layer is composed of liquid crystal layer.

6. A plasma addressed electro-optical device according to claim 1, wherein said microsheet glass has the thickness of 50 μm or less.

7. A plasma addressed electro-optical device according to claim 1, wherein said barrier ribs are formed on said second electrodes.

* * * * *